United States Patent
Neuhoff et al.

(10) Patent No.: US 11,277,742 B2
(45) Date of Patent: Mar. 15, 2022

(54) METHOD FOR OPERATING AUTHENTICATION SYSTEM AND AUTHENTICATION SYSTEM

(71) Applicants: Stefan Neuhoff, Essen (DE); Mirko Schindler, Velbert (DE)

(72) Inventors: Stefan Neuhoff, Essen (DE); Mirko Schindler, Velbert (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 208 days.

(21) Appl. No.: 16/608,607

(22) PCT Filed: Mar. 22, 2018

(86) PCT No.: PCT/EP2018/057235
§ 371 (c)(1),
(2) Date: Oct. 25, 2019

(87) PCT Pub. No.: WO2018/197116
PCT Pub. Date: Nov. 1, 2018

(65) Prior Publication Data
US 2021/0120407 A1 Apr. 22, 2021

(30) Foreign Application Priority Data
Apr. 28, 2017 (DE) .................. 10 2017 109 293.5

(51) Int. Cl.
*H04W 12/06* (2021.01)
*H04W 12/63* (2021.01)
(Continued)

(52) U.S. Cl.
CPC .......... *H04W 12/06* (2013.01); *B60R 25/245* (2013.01); *H04W 12/03* (2021.01); *H04W 12/63* (2021.01); *B60R 2325/108* (2013.01)

(58) Field of Classification Search
CPC ..... H04W 12/06; H04W 12/63; H04W 12/03; B60R 2325/108; G07C 2209/64
See application file for complete search history.

(56) References Cited

U.S. PATENT DOCUMENTS

2003/0095040 A1 5/2003 Shimomura
2007/0162191 A1 7/2007 Matsubara et al.
(Continued)

FOREIGN PATENT DOCUMENTS

CN 102602363 A 7/2012
CN 104029653 A 9/2014
(Continued)

OTHER PUBLICATIONS

Chinese Search Report of Parallel Chinese Patent Application No. 201880028176.4 dated Feb. 4, 2021, (2 pages).
(Continued)

*Primary Examiner* — Vernal U Brown
(74) *Attorney, Agent, or Firm* — Fay Sharpe LLP

(57) ABSTRACT

A vehicle authentication system for authenticating a portable ID transmitter with respect to an authentication arrangement of a vehicle in order to release vehicle functions for an operator, includes a portable ID transmitter that has at least one ID transmitter-UWB-antenna. The authentication device has at least one first vehicle-UWB-interface having one first UWB antenna and a second vehicle-UWB interface with a second UWB-antenna. Control for the authentication device are also provided so that an authentication method can be carried out. Optionally, the authentication system can also include LF interfaces with LF antennas and proximity sensors.

14 Claims, 3 Drawing Sheets

(51) Int. Cl.
*H04W 12/03* (2021.01)
*B60R 25/24* (2013.01)

(56) References Cited

U.S. PATENT DOCUMENTS

| | | | |
|---|---|---|---|
| 2013/0342379 A1* | 12/2013 | Bauman | G01S 13/0209 342/21 |
| 2015/0170444 A1 | 6/2015 | Yasui et al. | |
| 2015/0291126 A1 | 10/2015 | Nicholls et al. | |
| 2016/0234008 A1 | 8/2016 | Hekstra et al. | |
| 2017/0285634 A1 | 10/2017 | Chin | |
| 2018/0093642 A1 | 4/2018 | Casagrande et al. | |
| 2018/0162321 A1 | 6/2018 | Spiess | |
| 2019/0061689 A1* | 2/2019 | Breer | B60R 25/2081 |
| 2019/0355196 A1* | 11/2019 | Plattner | G07C 9/00309 |

FOREIGN PATENT DOCUMENTS

| | | |
|---|---|---|
| EP | 0 735 219 A2 | 10/1996 |
| EP | 0 965 710 A2 | 12/1999 |
| EP | 1 447 775 A2 | 8/2004 |
| EP | 1 473 426 A1 | 11/2004 |
| EP | 2 800 068 A2 | 11/2014 |
| EP | 2 813 963 A1 | 12/2014 |
| GB | 2 538 341 A | 2/2016 |
| WO | WO 2016/046105 A1 | 3/2016 |
| WO | WO 2016/059451 A | 4/2016 |

OTHER PUBLICATIONS

International Preliminary Report on Patentability/Written Opinion of International Application No. PCT/EP2018/057235 dated Mar. 22, 2018 (with English Translation, 19 pages.
International Search Report of International Application No. PCT/EP2018/057235 dated Jul. 6, 2018, 6 pages.

* cited by examiner

METHOD FOR OPERATING AUTHENTICATION SYSTEM AND AUTHENTICATION SYSTEM

BACKGROUND

The invention relates to a method for operating an authentication system of a vehicle for authenticating a portable ID transmitter. In particular, the invention relates to an authentication system by means of which a portable ID transmitter can be authenticated with respect to the vehicle in order to enable vehicle functions for an operator who is carrying the portable ID transmitter.

Various so-called keyless entry systems are known from the prior art. Said systems are based on the communication between an in-vehicle infrastructure and a portable ID transmitter via radio. As part of the wireless communication carried out, the desired authentication is performed, for example by exchanging and checking encrypted authorization data.

In the field of keyless entry systems, the use of low-frequency (LF) and high-frequency (HF) radio waves is known and widely used. The combined communication by means of LF/HF systems is known from the prior art.

In radio-based authorization systems, security, in particular against compromised radio communication, is of crucial importance. In the context of enabling a vehicle function using a portable ID transmitter, the determination of a position, distance or similar variable, for example, for determining the plausibility of the bidirectional communication carried out, is known from the prior art. For example, it is known to analyze the signal strength of an LF radio communication between a portable ID transmitter and an in-vehicle authentication assembly. A complementary or alternatively provided concept for increasing security against being compromised can simply be based on the fact that the transmission power of an LF communication is limited. By limiting the transmission power of an LF communication between the vehicle and the ID transmitter, it is ensured that, for example, an LF wake-up signal, which is transmitted from the vehicle to the ID transmitter, can only be received by the other communication partner if a maximum distance between the ID transmitter and vehicle is not exceeded.

Many of the known authentication systems still have the fundamental disadvantage that LF radio communication or HF radio communication can be extended, for example in the context of so-called relay station attacks. In order to avoid such compromises or other compromises, countermeasures are required, which are sometimes expensive, however.

The problem addressed by the invention is therefore to improve the known authentication methods such that they provide effective but at the same time comparatively inexpensive protection against the transmitted signals being compromised.

BRIEF SUMMARY

The problem is solved according to the invention by a method having the features of claim 1 and by an authentication system having the features of claim 12.

The method provides that an authentication system of a vehicle is operated in order to authenticate a portable ID transmitter with respect to the vehicle. Authentication serves the purpose of enabling a vehicle function for an operator who is carrying the portable ID transmitter.

The authentication system includes the portable ID transmitter and an in-vehicle authentication assembly.

The authentication assembly comprises a number of UWB antennas, at least one first UWB antenna and one second UWB antenna in any case. The first UWB antenna and the second UWB antenna are spaced apart from one another on the vehicle. The method provides at least the following steps:

A) selecting a UWB antenna from the number of UWB antennas of the authentication assembly as a selected UWB antenna. The selection of the UWB antenna takes place at least on the basis of a received signal strength or a plurality of received signal strengths of at least one LF signal which is transmitted between the ID transmitter and the authentication assembly, both possible transmission directions being able to be provided, and/or on the basis of a received signal strength or a plurality of received signal strengths of at least one HF signal which is transmitted between the ID transmitter and the authentication assembly, both possible transmission directions being able to be provided, and/or on the basis of at least one proximity signal from a proximity sensor or a plurality of proximity sensors which are arranged on the vehicle;

B) actuating the selected UWB antenna to carry out UWB communication between the ID transmitter and the authentication assembly;

C) carrying out the UWB communication between the ID transmitter and the authentication assembly;

D) detecting a propagation time of a UWB signal of the UWB communication between the ID transmitter and the selected UWB antenna;

E) checking whether the propagation time of the UWB signal is less than a predetermined maximum propagation time.

An essential aspect of the method according to the invention is based on the use of ultra-wideband communication.

In principle, the use of ultra-wideband (UWB) radio signals is known for some prior art applications. However, only recently market-ready transceivers are available to be used.

Ultra-wideband technology has been fundamentally known for a long time. However, it has only become accessible for use in a wide range of applications in the recent past, not least because of more liberal regulation.

Ultra-wideband technology is short-range radio communication based on emitting short signal pulses that cover a wide range of frequencies within a wide frequency bandwidth. The width of the frequency ranges covered depends in particular on the regulatory requirements of the corresponding territorial area.

A disadvantage of UWB communication compared with established LF and/or HF communication is the comparatively high pulsed current requirement of many transceivers that are currently available and are suitable for UWB communication.

However, UWB communication has the principal advantage that due to the emission of pulses, distance determination can be performed by means of a propagation-time-based approach, which is often referred to as the time-of-flight method. For example, the distance between the first UWB antenna and the portable ID transmitter can be determined by transmitting a UWB signal from the first UWB antenna to the portable ID transmitter, a UWB transceiver of the portable ID transmitter responding thereto, and a unit coupled to the first UWB antenna unit, for example a control means, analyzing the detected response signal. This is carried out by analyzing the time that elapsed between transmission and reception. The distance to the ID transmitter, the processing time within the ID transmitter and the distance from the ID transmitter to the first UWB antenna are taken into account. If, as in this example, the propagation time is analyzed in-vehicle, only the processing time must be stored in-vehicle within the ID transmitter, such that a corresponding correction of the in-vehicle-measured time between transmitting the UWB signal and receiving the UWB response can be made.

Experience has shown that the accuracy of such an UWB-based distance determination in the standard intended orders of magnitude of distances is significantly higher than is the case for other methods, such as signal strength determination of LF signals or triangulation of LF signals. The accuracy is often in the order of 10 to 20 cm for the UWB-based distance determinations.

Due to the fact that the pure propagation time of the UWB signal is relatively short compared with the processing time, additional processing of the signal, for example for a manipulation of the signal in the context of a relay station attack, can be detected due to the unexpectedly high total duration between transmission of a UWB signal and the corresponding response arriving. Compromises, for example in the manner of the described relay station attacks, are thus possible, if at all, only with very complex methods.

Another benefit of using the UWB signals is that shadowing of the signals is very unlikely due to the wide range of frequencies used. This is because there is a high probability of there always being a line of sight between the transmitter and receiver, at least for some of the simultaneously used frequencies. One reason is that diffraction effects or reflections can be expected for some frequencies.

According to the invention, it is provided that a selected UWB antenna is selected from the number of UWB antennas prior to actuating a UWB antenna to carry out UWB communication. By selecting a selected UWB antenna, under favorable circumstances it can be achieved that the information required for distance determination can be obtained by actuating only some of the UWB antennas of the authentication assembly. If this is the case, further UWB communication using the other existing UWB antennas of the authentication assembly can be dispensed with. Using the method according to the invention, it is thus advantageously achieved that the energy requirements for carrying out UWB communication during an authentication process is advantageously reduced.

The first UWB antenna is preferably part of a first vehicle/UWB interface and the second UWB antenna is part of a second vehicle/UWB interface.

Particularly preferably, the first UWB antenna is part of a first UWB transceiver and the second UWB antenna is part of a second UWB transceiver. This allows for a compact construction and a simple configuration.

Preferably, the first and the second UWB interface are coupled to the same control means, such as an in-motor-vehicle controller.

According to the invention, it is provided that the selected UWB antenna is actuated. As a result of actuating the selected UWB antenna, UWB communication is enabled between the ID transmitter and the authentication assembly. For example, it can be provided that the selected UWB antenna transmits a UWB signal to the ID transmitter, which receives and responds to the signal, for example by means of a UWB transceiver of the ID transmitter, and then the response from the selected UWB antenna is received and is preferably subsequently analyzed by an in-vehicle central control means. Alternatively, it may also be provided that the ID transmitter, in turn by means of its UWB transceiver, causes a UWB signal to be transmitted, and said signal is detected and responded to by the selected UWB antenna, at which point the response transmitted as the UWB signal from the ID transmitter is detected and analyzed.

In order to technically implement the actuation of the selected UWB antenna, it may for example be provided that the authentication assembly comprises UWB transceivers which comprise a UWB antenna as a component. For example, it may be provided in a regular state that the first UWB transceiver comprising the first UWB antenna is not in a state ready to transmit and receive, and that an in-vehicle controller actuates the UWB transceiver comprising the selected UWB antenna after selecting a UWB antenna in order to put the UWB antenna into a ready-to-receive state. Alternatively, it may also be provided that the in-vehicle controller puts the UWB antenna into a ready-to-transmit state in the same way and causes the above-mentioned UWB signal to be transmitted via the selected UWB antenna.

By transmitting a UWB signal and responding to the UWB signal, the carrying out of the UWB communication provided according to the invention takes place. Subsequently, the propagation time of the UWB signal can be detected and the intended check can be made as to whether the propagation time of the UWB signal is less than a predetermined maximum propagation time.

As already mentioned above, depending on the configuration of the method, for analyzing the propagation time, both the ID transmitter can be used, which transmits the result hereafter to an in-vehicle entity such as the central control means, or alternatively an in-vehicle entity such as the central control means can be determined for the analysis of the propagation time.

If the propagation time of the UWB signal is less than a predetermined maximum propagation time, it can be assumed in-vehicle that the bidirectional UWB communication carried out has not been extended. Depending on the need for security, the maximum propagation time can be adapted such that, on the one hand, a sufficiently high accuracy of the distance determination is possible, and, on the other hand, it can be assumed that a compromised UWB signal can be excluded or largely excluded within the detected maximum propagation time.

An essential aspect of the invention is based on the fact that a selected antenna is determined from the number of existing UWB antennas, which is then actuated to carry out a UWB communication. By selecting a UWB antenna from the existing UWB antennas, the implementer of the method for a specific application will be given the option of reducing the energy required for UWB communication on the basis of on one or more previously detected parameters. Depending on which practicability and/or security needs are pursued or need to be taken into account by the implementing developer, different parameters can be used. It is expedient for a less energy-intensive method to be used to detect these parameters than the UWB communication or for existing, already detected parameters to be used. On the basis of this data, a control means, preferably an in-vehicle control means, can determine which UWB antenna will carry out UWB communication and/or in which order different existing UWB antennas are used for UWB communication.

One option is to make the selection of the UWB antenna on the basis of a received signal strength of an LF signal which is transmitted between the ID transmitter and the authentication assembly. For this purpose, a portable ID transmitter configured for LF communication and at least one, preferably more than one, LF interface arranged on the vehicle are required. The term "LF interface" refers to a set of devices required for LF communication and includes at least one LF antenna and a transceiver circuit coupled to the LF antenna. An arrangement of this kind is provided anyway in many cases in connection with the keyless ID transmitters mentioned at the outset. For example, an LF signal may be transmitted by one or more LF interfaces of the in-vehicle authentication assembly to the ID transmitter, which receives said signals by means of an LF receiver or LF transceiver and then determines the signal strength. For example, it may be provided that two LF interfaces arranged at different positions on the vehicle each transmit a differently coded LF signal to the ID transmitter, and the ID transmitter returns the detected signal strength values, for example in the form of RSSI values, together with the relevant code of the ID transmitter to the in-vehicle LF interfaces. Data of this kind can then be analyzed by an in-vehicle control apparatus. As a result of the analysis, it can be determined, for example, that the UWB antenna from the number of UWB antennas of the authentication assembly that is closest to the LF interface with the strongest LF signal is actuated with priority.

For example, the UWB antenna may then be selected as the first selected UWB antenna positioned closest to the LF interface that transmitted the LF signal with the highest signal strength.

A similar procedure can be used with HF signals. For example, an HF signal can be transmitted between the ID transmitter and the authentication assembly, either from the ID transmitter to the authentication assembly or from the authentication assembly to the ID transmitter, and the signal strength thereof can be detected, for example at two different reception points on the in-vehicle authentication assembly.

For example, another approach may be based on using data from a proximity sensor. For example, a proximity sensor already provided in the vehicle or a proximity sensor specially arranged on the vehicle for this purpose may output a proximity signal detected by a control means coupled to the proximity sensor when the operator approaches, at which point the control means actuates the UWB antenna from a number of UWB antennas that is closest to the proximity sensor.

It may be provided that the actuated UWB antenna is enabled for receiving UWB signals and that communication is initiated on the part of the ID transmitter. It may be provided that this takes place in response to a corresponding LF signal instruction on the part of the in-vehicle authentication assembly, which is transmitted via an LF interface of the authentication assembly. Alternatively, the selected UWB antenna may be used for transmitting a UWB signal by means of which the UWB communication of the authentication assembly with the ID transmitter is initiated. It is essential that the selection for preparing one or more UWB antennas from a plurality of UWB antennas takes place on the basis of previously obtained parameters, in particular in the above-mentioned manner.

Advantageous and/or preferred developments of the invention are found in the dependent claims.

In a development of the method, it is provided that the above-mentioned steps B) to E) are first carried out using a first selected UWB antenna and, if the propagation time of the UWB signal between the ID transmitter and the first selected antenna is greater than a predetermined maximum propagation time, at least steps B) to E) are carried out again. Carrying out steps B) to E) again is performed, in contrast with the first instance of carrying out steps B) to E), using a second selected UWB antenna with the aim of checking whether the propagation time of the UWB signal between the ID transmitter and the second selected antenna is less than the predetermined maximum propagation time.

It is thus provided that, in addition to carrying out the method according to the invention using a first selected antenna without success, a second UWB antenna of the in-vehicle authentication assembly is selected for carrying out a distance determination. This ensures that the reliability of the method is increased. In a case in which, for example, there is shadowing of the first UWB antenna, even if this is unlikely, an incorrect result of the distance determination is prevented even if the ID transmitter is actually a sufficiently short distance from the vehicle. By sequentially repeating the method steps B)-E) first using the first UWB antenna and then using the second UWB antenna, the method is performed taking into account a prioritization of the UWB antennas. As a result, in many cases it is achieved that the method is already successful using the first selected antenna. The gain in reliability is therefore not accompanied by a disproportionately high increase in energy requirements.

According to another embodiment, it is provided that selecting the UWB includes compiling a list that predetermines prioritization of the UWB antennas. Taking into account the compiled list, steps B)-E) are repeated taking into account the prioritization of the UWB antennas predetermined by the list until a predetermined termination condition is reached. This means that, even before carrying out a UWB communication, a sequence of the existing UWB antennas in which the UWB antennas are actuated is determined. As a result, even before carrying out a UWB communication for determining the distance of the ID transmitter, the sequence in which the UWB antennas of the authentication assembly are actuated is established. Steps B) to E) are repeatedly carried out sequentially for each UWB antenna in the prioritizing list until a termination condition is reached. As a termination condition, it may be provided, for example, that the end of the list is reached. Another termination condition may be that the distance of the ID transmitter is detected as being within the zone in which a maximum propagation time of the UWB communication is not reached.

Another advantageous development of the invention may provide that the termination conditions includes the fact that the propagation time of the UWB signal between the ID transmitter and the selected UWB antenna does not exceed a predetermined maximum deviation for a predetermined subset of the number of UWB antennas. Because a predetermined number of UWB antennas, i.e. preferably at least two or more UWB antennas, must recognize the ID transmitter as being located within the security zone, the susceptibility of the system to error is reduced, in particular the probability that the method according to the invention still works is increased, even if one of the UWB antennas is defective.

Another embodiment of the method according to the invention may provide that the list is adjusted before steps B) to E) are repeated. In other words, it may be provided that the list is adjusted before actuating the next selected UWB antenna. In particular, it may be provided that the adaptation of the list is taken into account on the basis of the propagation time of the UWB signal between the ID transmitter and the UWB antenna actuated during the method sequence of steps B) to E) performed immediately before. Depending on the number and position of the existing LF interfaces and/or HF interfaces and/or proximity sensors, such an adjustment may result in more precise isolation of the location of the ID transmitter using the distance determinations additionally performed in the meantime on the basis of a UWB signal. On the basis of such a determination of the location, the compiled list can then be dynamically adjusted, for example on the part of an in-vehicle control means of the authentication assembly.

According to another advantageous embodiment, it can for example be provided that a UWB antenna is removed from the list before steps B) to E) are repeated if the propagation time of the UWB signal exceeds a predetermined maximum propagation time control deviation from the propagation time of the UWB signals from a number of UWB antennas, and/or a signal strength of the UWB signal exceeds a predetermined maximum signal strength control deviation from the signal strength of the UWB signals from a number of UWB antennas.

In other words, it may be provided that the UWB communication data already obtained while the method was being carried out, in particular propagation times and/or signal strengths, is analyzed in order to ascertain if a particular UWB antenna from the number of UWB antennas provides significantly differing results compared with the previously obtained data. By suitably selecting the predetermined maximum propagation time control deviations and/or the predetermined maximum signal strength control deviation, an anomaly present in the UWB antennas, for example due to a defect or shadowing, can be detected. By disregarding this UWB antenna in the remainder of the method, the accuracy of the result obtained can be increased.

According to a possible implementation of the method, it may be provided that the authentication assembly comprises a first LF interface which is assigned to the first UWB antenna and comprises a second LF interface which is assigned to the second LF antenna.

In this development, it is further provided that a first LF communication is carried out using a first LF signal between the ID transmitter and the first LF interface and a second LF communication is carried out using a second LF signal between the ID transmitter and the second LF interface. The first LF signal and the second LF signal may differ from one another one account of a transmitted code, for example.

In the context of this development, it may be provided that the ID transmitter detects a first signal strength of the first LF signal and a second signal strength of the second LF signal. The signal strengths are then transmitted to the authentication assembly, at which point a control means of the authentication assembly selects the UWB antenna of the first UWB antennas and the second UWB antennas for the first actuation of the UWB antenna assigned to the LF interface that transmitted the LF signal with the highest of the LF signal strengths.

In the same way, an HF interface can be used instead of an LF interface.

An alternative development of the method according to the invention may provide that the authentication assembly comprises a first proximity sensor which is assigned to the first UWB antenna and comprises a second proximity sensor which is assigned to the second UWB antenna. According to this development, those of the first proximity sensor and the second proximity sensor which detect an approach of the operator output an approach signal. It is provided here that, when it detects the proximity signal, a control means of the authentication assembly selects, as the selected UWB antenna, the first UWB antenna and the second UWB antenna that are associated with that of the first approach sensor and the second approach sensor which has output the approach signal.

In particular, it may be provided that the first UWB antenna is a shorter distance from the first proximity sensor than from the second proximity sensor and that the second UWB antenna is a shorter distance from the second proximity sensor than from the first proximity sensor. As a result, it can for example be achieved that the selection of the UWB antennas can be determined taking into account data which are coupled to already existing proximity sensors, such as capacitive sensors in door handles.

A further development may provide that UWB communication is carried out at least at the same time as an LF communication or HF communication is carried out.

Furthermore, it may for example be provided that UWB signal propagation times detected for enabling vehicle functions are considered valid for a minimum time period, and in that UWB communication is not carried out by the authentication assembly during the minimum time period. In other words, if the authentication assembly has detected the ID transmitter within a distance zone authorizing vehicle functions to be enabled, a control apparatus of the authentication assembly can assume, for a predetermined minimum time period, that the ID transmitter remains within this distance zone. This can reduce the energy required for UWB communications, with a kind of trade-off being made between energy savings and a potential loss of security.

The ID transmitter itself can be authenticated if the above-described requirements are met and the system has thus recognized the ID transmitter as being located within the secure bubble. The authentication is implemented at the discretion of the implementer of the method. For example, authentication may be carried out based on exchanging cryptographic information between the ID transmitter and a control means of the authentication system of the vehicle, such as the in-vehicle controller.

The actual authentication of the ID transmitter can for example be carried out to complete the method, with, in one embodiment, the successfully completed check in step E that the propagation time of the UWB signal between the ID transmitter and at least one selected UWB antenna is less than the predetermined maximum propagation time being a necessary condition for an authentication and a function enabling to be performed.

If the check in step E confirms the predetermined maximum propagation time as not being reached, the authentication can be checked in-vehicle on the basis of radio-exchanged information between the ID transmitter and the authentication assembly. The information is preferably exchanged by means of for example bidirectional LF, HF and/or UWB communication between the ID transmitter and the in-vehicle authentication assembly.

Particularly preferably, the information exchange takes place beforehand, namely as part of the UWB communication in step C. By using the same UWB communication for the authenticating information exchange and the distance determination, the risk of compromise of the signal is largely, if not completely, eliminated in a time and security-optimized manner.

In a specific development, the exchange of cryptographic information in the context of the communication between the ID transmitter and the authentication assembly, the above-described step C, can be carried out, inter alia, with the advantage of speed gain.

Vehicle functions can be successfully authenticated and possibly enabled in any manner, but it must be ensured as a necessary condition, at least by means of the method according to the invention, that the propagation time of the UWB signal between the ID transmitter and at least one of the selected antennas is less than the predetermined maximum propagation time which is equivalent to the validation that the ID transmitter is located within the so-called secure bubble.

For example, it can be provided that, once the check in step E with at least one selected antenna has confirmed the presence of the ID transmitter within a maximum distance from the selected antenna, cryptographic information is transmitted between the ID transmitter and an in-vehicle controller of the authentication system by means of HF communication, LF communication and/or UWB communication and the authentication of the ID transmitter is completed on the basis of the analysis of the cryptographic information in the in-vehicle controller and the function or functions is/are enabled. Alternatively or additionally, the cryptographic information may be partially or completely exchanged before completion of the check in step E.

In one embodiment, the function is blocked from being enabled for the operator on board the vehicle if the check in step E with at least one selected antenna has not confirmed the presence of the ID transmitter within a maximum distance from the selected antenna within a predetermined maximum time period.

Another aspect of the invention relates to an authentication system of a vehicle for authenticating a portable ID transmitter with respect to the vehicle for enabling vehicle functions for an operator who is carrying the portable ID transmitter.

The authentication system comprises the portable ID transmitter and an in-vehicle authentication assembly. The portable ID transmitter comprises at least one first ID transmitter/UWB interface with an ID transmitter/UWB antenna and the authentication assembly comprises at least one first vehicle/UWB interface with a first UWB antenna and a second vehicle/UWB interface with a second UWB antenna which are spaced apart from one another on the vehicle. The first ID transmitter/UWB interface and the vehicle/UWB interfaces are configured for UWB communication with one another.

A control means of the authentication assembly is designed to control and monitor the carrying out of a method according to any of the approaches explained above and/or below.

Features of the method can be combined with features of the authentication system, and vice versa. The advantages of the authentication system should also be considered to be advantages of the method in the same way.

Further details, features and advantages of the method according to the invention and its development will become apparent from the following description taken in conjunction with the drawings, in which exemplary embodiments of the invention are shown.

BRIEF DESCRIPTION OF THE DRAWINGS

It goes without saying that the features mentioned above and below can be used not only in the combination indicated but also in other combinations or in isolation. In the drawings.

DETAILED DESCRIPTION

Figure 1:
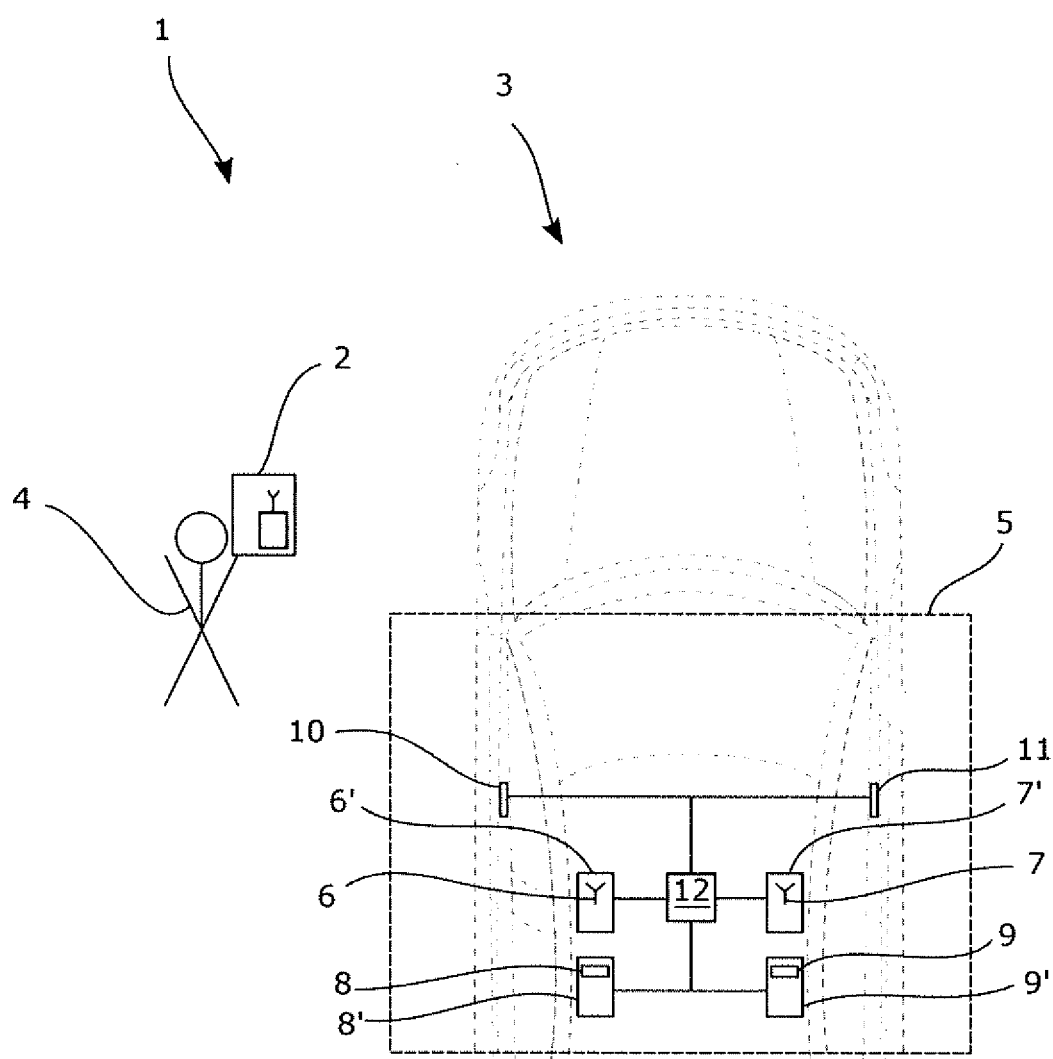
FIG. 1 is a schematic view of an authentication system.

FIG. 1 shows an authentication system 1 by means of which the method according to the invention can be carried out. The authentication system 1 is used to authenticate an ID transmitter 2 with respect to a vehicle 3. FIG. 1 shows a situation in which the ID transmitter 2 is in the possession of an operator 4. With the method according to the invention, the portable ID transmitter 2 can be authenticated with respect to the vehicle 3 such that the operator 4 carrying the portable ID transmitter can access vehicle functions such as starting the vehicle 3 or opening one or more of the vehicle doors.

The authentication system comprises, in addition to the portable ID transmitter 2, an in-vehicle authentication assembly 5. The authentication assembly comprises at least a number of UWB antennas, at least one first UWB antenna 6 and one second UWB antenna 7 being provided that are spaced apart from one another on the vehicle. In the embodiment shown, the first UWB antenna 6 is provided as an integral element of a first UWB transceiver 6' and the second UWB antenna 7 is provided as an integral element of a second UWB transceiver 7'.

The authentication assembly further comprises a first LF interface. 8' with at least one first LF antenna 8 and a second LF interface 9' with a second LF antenna 9 as well as a first proximity sensor 10 and a second proximity sensor 11. The first proximity sensor 10 is arranged within a door handle of the left-hand vehicle door, while the second proximity sensor 11 is arranged within the door handle of the passenger door. Both the first LF interface 8 and the first proximity sensor 10 are a shorter distance from the first UWB antenna 6 than from the second UWB antenna 7. Furthermore, both the second LF interface 9 and the second proximity sensor 11 are a shorter distance from the second UWB antenna 7 than from the first UWB antenna 6.

In the embodiment shown, the UWB transceivers, the LF interfaces and the proximity sensors are coupled to an in-vehicle controller 12, and are also coupled to one another thereby. The in-motor-vehicle control unit 12 is suitable for controlling and monitoring a method according to the invention and its developments as the control means of the authentication assembly.

Figure 2:
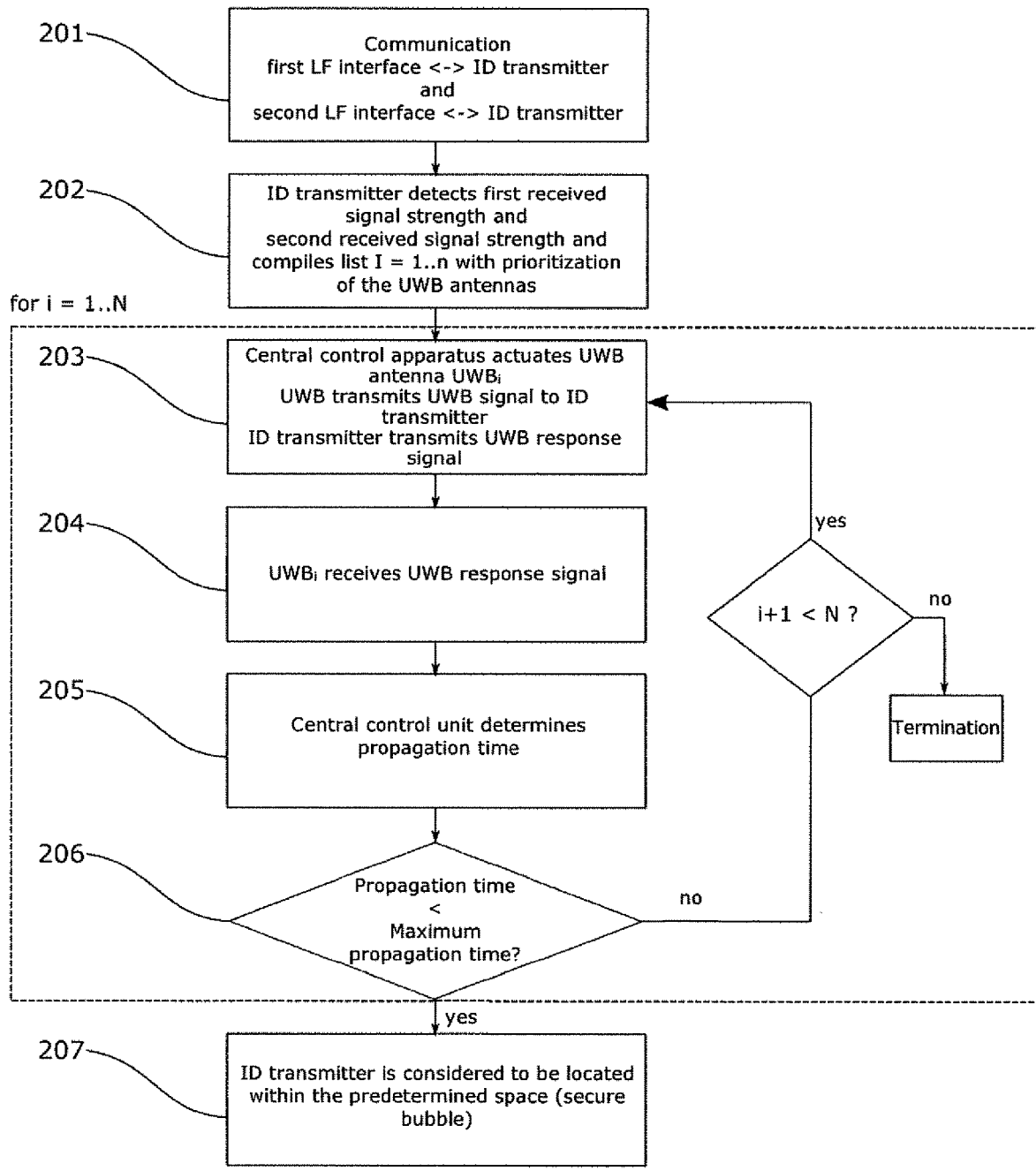
FIG. 2 shows a flowchart of an exemplary method sequence of the method according to the invention.

In the exemplary sequence of the method according to the invention, as shown in FIG. 2, in a first step, LF communication is performed between the first LF interface and the ID transmitter as well as the second LF interface and the ID transmitter. This can be carried out, for example, in response to actuation of a proximity sensor or as a result of polling, which is of secondary importance to the basic operation of the method sequence shown.

In step 202, the ID transmitter detects a first signal strength of the first LF signal and a second signal strength of the second LF signal. After detecting the first and the second signal strength, the ID transmitter transmits the signal strengths to authentication assemblies by means of a message transmitted as part of an LF transmission. The detected data are received by a control means of the authentication assembly, which is coupled both to the LF interfaces and the UWB antennas, and transmitted to the in-vehicle control apparatus for analysis. The analysis could alternatively take place in the key. The control apparatus generates a list in which the UWB antenna of the UWB antennas is selected for the first actuation of the UWB antenna assigned to the LF interface that transmitted the LF signal with the highest of the LF signal strengths.

In the method sequence shown, this means that if the first signal strength is greater than the second signal strength, the first UWB antenna is positioned in front of the second UWB antenna in the list.

Therefore, with step 201 and step 202, a UWB antenna was selected from the number of UWB antennas as the selected UWB antenna. The selection was made on the basis of a received signal strength, for example an RSSI value, of the first LF signal which was transmitted between the ID transmitter and the authentication assembly. In addition to the first selected UWB antenna, the second UWB antenna has been designated as the second selected UWB antenna, and therefore the list includes a number of selected antennas.

In the next step 203, according to the prioritization predetermined in the list, the first UWB antenna, $UWB_1$, is first moved from a state not ready to transmit and receive into a ready-to-transmit state by the first UWB antenna being actuated by the central control apparatus. The first UWB antenna transmits a first UWB signal to the ID transmitter. The UWB signal is then received by a UWB transceiver of the ID transmitter and responded to with a UWB response signal. The signal is received in step 204 by the first UWB antenna. Taking into account the in-vehicle control apparatus, the propagation time is determined which the UWB signal has required on the way to the ID transmitter and additionally on the way back from the ID transmitter, with a corresponding calculation time within the ID transmitter of the control apparatus being known and thereby being able to be deducted from the time period actually recorded. In step 205, the propagation time is calculated by the central control apparatus, and in step 206 it is checked whether the propagation time of the UWB signal is less than a predetermined maximum propagation time. If this is the case, the ID transmitter for the authentication system is considered to be within the space in which the vehicle function is enabled (secure bubble). Furthermore, a compromise of the signal, for example by a relay station attack, is considered not to have taken place. If, however, it is determined in step 206 that the propagation time is greater than the predetermined maximum propagation time, the method sequence of steps 203 to 206 is repeated beginning with step 203, with the next list element of the list being used, where the list elements i=1 . . . N. In this example, the next list item is the second UWB antenna. Therefore, the second UWB antenna is then activated as the second selected antenna, such that a propagation time measurement is again initiated by the second UWB interface.

Steps 203 to 206 are carried out for all UWB antennas i=1 . . . N in the list, the following list element i+1 following the list element i and termination being carried out at the latest when either the ID transmitter can be considered to be within the predetermined space or if the list is completed.

If the ID transmitter can be considered to be within the predetermined space, the necessary requirement for the authentication of the ID transmitter is met. In a final step, if necessary, further requirements are checked, for example via an exchange of cryptographic information, and the authentication is concluded upon successful analysis of the cryptographic information.

Figure 3:
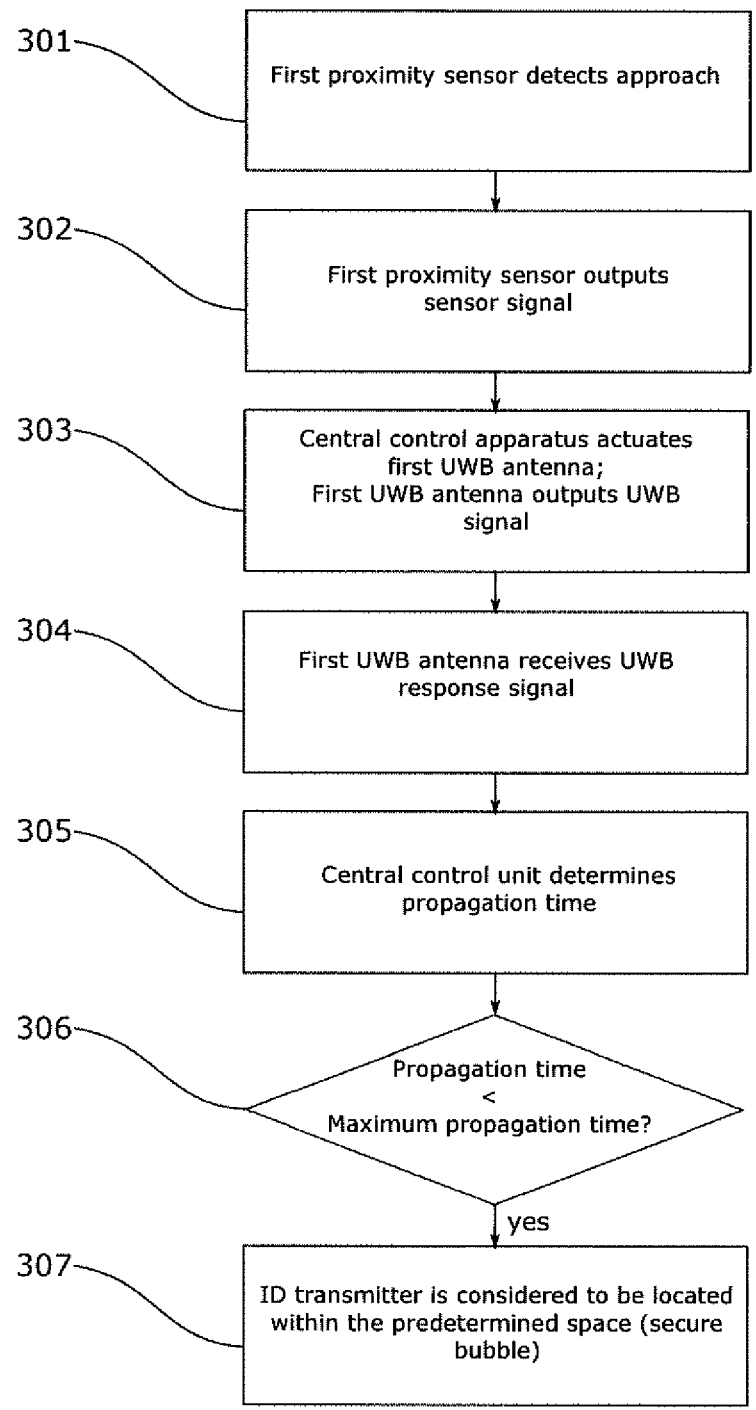
FIG. 3 shows a flowchart of an alternative method sequence of the method according to the invention.

The method sequence in FIG. 3 differs from the method sequence shown in FIG. 2 in that, in step 301, the operator is detected as approaching by the first proximity sensor. The first proximity sensor outputs a proximity signal to the central control apparatus in step 302, the control apparatus of the authentication assembly recognizing which of the proximity sensors has detected the approach. In the method sequence shown, the first proximity sensor has detected an approach, for which reason the first UWB antenna is determined as the selected UWB antenna, and steps 303 to 307 are carried out using the same approach as FIG. 2.

The invention claimed is:

1. A method for operating an authentication system of a vehicle for authenticating a portable ID transmitter with respect to the vehicle for enabling vehicle functions for an operator who is carrying the portable ID transmitter,
   wherein the authentication system comprises the portable ID transmitter and an in-vehicle authentication assembly, wherein the authentication assembly comprises a number of UWB antennas having at least one first UWB antenna and one second UWB antenna that are spaced apart from one another on the vehicle,
   wherein the method comprises the following steps:
   A) selecting a UWB antenna from the number of UWB antennas of the authentication assembly as a selected UWB antenna, wherein the selection of the UWB antenna takes place at least
      on the basis of a received signal strength of an LF signal which is transmitted between the ID transmitter and an LF interface of the authentication assembly, and/or
      on the basis of a received signal strength of an HF signal which is transmitted between the ID transmitter and an HF interface of the authentication assembly, and/or
      on the basis of a proximity signal from a proximity sensor which is arranged on the vehicle;
   B) actuating the selected UWB antenna to carry out UWB communication between the ID transmitter and the authentication assembly;
   C) carrying out the UWB communication between the ID transmitter and the authentication assembly;
   D) detecting a propagation time of a UWB signal of the UWB communication between the ID transmitter and the selected UWB antenna;
   E) checking whether the propagation time of the UWB signal is less than a predetermined maximum propagation time, wherein
   the steps B)-E) are carried out using a first selected UWB antenna and,
   if the propagation time of the UWB signal between the ID transmitter and the first selected antenna is greater than a predetermined maximum propagation time,
   steps B)-E) are carried out using a second selected UWB antenna to check whether the propagation time of the UWB signal between the ID transmitter and the second selected antenna is less than the predetermined maximum propagation time, which represents a position of the ID transmitter within a predetermined space surrounding the second selected UWB antenna.

2. Method according to claim 1, wherein
   the authentication assembly comprises a first proximity sensor which is assigned to the first UWB antenna and comprises a second proximity sensor which is assigned to the second UWB antenna,
   when one of the proximity sensors detects the operator approaching, said proximity sensor outputting an approach signal identifying the proximity sensor, and in that, when it detects the proximity signal, a control means of the authentication assembly selects, as the selected UWB antenna, the first UWB antenna and the second UWB antenna that are associated with that of the first approach sensor and the second approach sensor which has output the approach signal.

3. Method according to claim 1, wherein the UWB communication is carried out at least at the same time as an LF communication or HF communication is carried out.

4. Method according to claim 1, wherein UWB signal propagation times detected for enabling vehicle functions are considered valid for a minimum time period, and in that UWB communication is not carried out by the authentication assembly during the minimum time period.

5. Method according to claim 1, wherein once the check in step E has shown that the propagation time of the UWB signal of the UWB communication carried out during step C between the ID transmitter and at least one selected UWB antenna is less than the predetermined maximum propagation time, on the basis of authentication data transmitted between the ID transmitter and the in-vehicle authentication assembly, the in-vehicle authentication assembly carries out a check of the authentication of the ID transmitter and, if the check confirms the authentication, causes the function to be enabled.

6. Method according to claim 1, wherein,
once the check in step E with at least one selected antenna has confirmed the presence of the ID transmitter within a maximum distance from the selected antenna, cryptographic information that is preferably transmitted following step E and is transmitted between the ID transmitter and an in-vehicle controller of the authentication system by means of HF communication, LF communication and/or UWB communication is analyzed and the authentication of the ID transmitter is completed on the basis of the analysis of the cryptographic information in the in-vehicle controller and the function or functions is/are enabled after successful authentication.

7. Method according to claim 1, wherein the function is blocked in-vehicle from being enabled for the operator if the check in step E with at least one selected antenna has not confirmed the presence of the ID transmitter within a maximum distance from the selected antenna within a predetermined maximum time period.

8. Authentication system of a vehicle for authenticating a portable ID transmitter with respect to the vehicle for enabling vehicle functions for an operator who is carrying the portable ID transmitter,
wherein the authentication system comprises the portable ID transmitter and an in-vehicle authentication assembly, wherein the portable ID transmitter comprises at least one first ID transmitter/UWB interface with an ID transmitter/UWB antenna and the authentication assembly comprises at least one first vehicle/UWB interface with a first UWB antenna and a second vehicle/UWB interface ith a second UWB antenna which are spaced apart from one another on the vehicle, and wherein the first ID transmitter/UWB interface and the vehicle/UWB interfaces are configured for UWB communication with one another,
wherein a control means of the authentication assembly is configured to carry out a method according to claim 1.

9. A method for operating an authentication system of a vehicle for authenticating a portable ID transmitter with respect to the vehicle for enabling vehicle functions for an operator who is carrying the portable ID transmitter,
wherein the authentication system comprises the portable ID transmitter and an in-vehicle authentication assembly, wherein the authentication assembly comprises a number of UWB antennas having at least one first UWB antenna and one second UWB antenna that are spaced apart from one another on the vehicle,
wherein the method comprises the following steps:
A) selecting a UWB antenna from the number of UWB antennas of the authentication assembly as a selected UWB antenna, wherein the selection of the UWB antenna takes place at least
on the basis of a received signal strength of an LF signal which is transmitted between the ID transmitter and an LF interface of the authentication assembly, and/or
on the basis of a received signal strength of an HF signal which is transmitted between the ID transmitter and an HF interface of the authentication assembly, and/or
on the basis of a proximity signal from a proximity sensor which is arranged on the vehicle;
B) actuating the selected UWB antenna to carry out UWB communication between the ID transmitter and the authentication assembly;
C) carrying out the UWB communication between the ID transmitter and the authentication assembly;
D) detecting a propagation time of a UWB signal of the UWB communication between the ID transmitter and the selected UWB antenna;
E) checking whether the propagation time of the UWB signal is less than a predetermined maximum propagation time, wherein selecting the UWB antenna in step A) includes compiling a list that predetermines prioritization of the UWB antennas, a sequence of steps B)-E) being repeated taking into account the prioritization of the UWB antennas predetermined by the list until a predetermined termination condition is reached.

10. Method according to claim 9, wherein the termination condition includes the fact that the propagation time of the UWB signal between the ID transmitter and the selected UWB antenna does not exceed a predetermined maximum deviation for a predetermined subset of the number of UWB antennas.

11. Method according to claim 9, wherein the list is adjusted before repeating steps B)-E).

12. Method according to claim 11, wherein a UWB antenna is removed from the list before repeating steps B)-E) if
the propagation time of the UWB signal exceeds a predetermined maximum propagation time control deviation from the propagation time of the UWB signals from a number of UWB antennas, and/or
a signal strength of the UWB signal exceeds a predetermined maximum signal strength control deviation from the signal strength of the UWB signals from a number of UWB antennas.

13. A method for operating an authentication system of a vehicle for authenticating a portable ID transmitter with respect to the vehicle for enabling vehicle functions for an operator who is carrying the portable ID transmitter,
wherein the authentication system comprises the portable ID transmitter and an in-vehicle authentication assembly, wherein the authentication assembly comprises a number of UWB antennas having at least one first UWB antenna and one second UWB antenna that are spaced apart from one another on the vehicle,
wherein the method comprises the following steps:
A) selecting a UWB antenna from the number of UWB antennas of the authentication assembly as a selected UWB antenna, wherein the selection of the UWB antenna takes place at least on the basis of a received signal strength of an LF signal which is transmitted between the ID transmitter and an LF interlace of the authentication assembly, and/or on the basis of a received signal strength of an HF signal which is transmitted between the ID transmitter and an HF interface of the authentication assembly, and/or on the basis of a proximity signal from a proximity sensor which is arranged on the vehicle;

B) actuating the selected UWB antenna to carry out UWB communication between the ID transmitter and the authentication assembly;

C) carrying out the UWB communication between the ID transmitter and the authentication assembly;

D) detecting a propagation time of a UWB signal of the UWB communication between the ID transmitter and the selected UWB antenna;

E) checking whether the propagation time of the UWB signal is less than a predetermined maximum propagation time, wherein the authentication assembly comprises a first LF interface which is assigned to the first UWB antenna and comprises a second LF interface which is assigned to the second UWB antenna, a first LF communication being carried out using a first LF signal between the ID transmitter and the first LF interface and a second LF communication being carried out using a second LF signal between the ID transmitter and the second LF interface, the ID transmitter detecting a first signal strength of the first LF signal and a second signal strength of the second LF signal and transmitting the signal strengths to the authentication assembly, the authentication assembly selecting those of the UWB antennas for the first actuation of the UWB antenna assigned to the LF interface that transmitted the LF signal with the highest of the LF signal strengths.

14. A method for operating an authentication system of a vehicle for authenticating a portable ID transmitter with respect to the vehicle for enabling vehicle functions for an operator who is carrying the portable ID transmitter, wherein the authentication system comprises the portable ID transmitter and an in-vehicle authentication assembly, wherein the authentication assembly comprises a number of UWB antennas having at least one first UWB antenna and one second UWB antenna that are spaced apart from one another on the vehicle, wherein the method comprises the following steps:

A) selecting a UWB antenna from the number of UWB antennas of the authentication assembly as a selected UWB antenna, wherein the selection of the UWB antenna takes place at least on the basis of a received signal strength of an LF signal which is transmitted between the ID transmitter and an LF interface of the authentication assembly, and/or on the basis of a received signal strength of an HF signal which is transmitted between the ID transmitter and an HF interface of the authentication assembly, and/or on the basis of a proximity signal from a proximity sensor which is arranged on the vehicle;

B) actuating the selected UWB antenna to carry out UWB communication between the ID transmitter and the authentication assembly;

C) carrying out the UWB communication between the ID transmitter and the authentication assembly;

D) detecting a propagation time of a UWB signal of the UWB communication between the ID transmitter and the selected UWB antenna;

E) checking whether the propagation time of the UWB signal is less than a predetermined maximum propagation time, wherein the authentication assembly comprises a first HF interface which is assigned to the first UWB antenna and comprises a second HF interface which is assigned to the second UWB antenna, a first HF communication being carried out using a first HF signal between the ID transmitter and the first HF interface and a second HF communication being carried out using a second HF signal between the ID transmitter and the second HF interface, the ID transmitter detecting a first signal strength of the first HF signal and a second signal strength of the second HF signal and transmitting the signal strengths to the authentication assembly, the authentication assembly selecting those of the first UWB antenna and second UWB antenna for the first actuation of the UWB antenna assigned to the HF interface that transmitted the HF signal with the highest of the first and second signal strengths.

* * * * *